US009448561B2

(12) United States Patent
Fujimoto et al.

(10) Patent No.: US 9,448,561 B2
(45) Date of Patent: Sep. 20, 2016

(54) WORK VEHICLE COOPERATION SYSTEM

(71) Applicant: Kubota Corporation, Osaka-shi (JP)

(72) Inventors: Yoshitomo Fujimoto, Sakai (JP); Hiroyuki Araki, Sakai (JP); Yasuhisa Uoya, Sakai (JP)

(73) Assignee: Kubota Coporation, Osaka (JP)

( * ) Notice: Subject to any disclaimer, the term of this patent is extended or adjusted under 35 U.S.C. 154(b) by 0 days.

(21) Appl. No.: 14/774,288

(22) PCT Filed: Mar. 19, 2015

(86) PCT No.: PCT/JP2015/058227
§ 371 (c)(1),
(2) Date: Sep. 10, 2015

(87) PCT Pub. No.: WO2015/146778
PCT Pub. Date: Oct. 1, 2015

(65) Prior Publication Data
US 2016/0109885 A1    Apr. 21, 2016

(30) Foreign Application Priority Data

Mar. 27, 2014  (JP) ................................. 2014-067006

(51) Int. Cl.
G05D 1/02       (2006.01)
A01B 69/00      (2006.01)
G05D 1/00       (2006.01)

(52) U.S. Cl.
CPC ............. *G05D 1/0295* (2013.01); *A01B 69/00* (2013.01); *G05D 1/0088* (2013.01); *G05D 1/02* (2013.01); *G05D 1/0219* (2013.01); *G05D 1/0278* (2013.01); *G05D 2201/0201* (2013.01)

(58) Field of Classification Search
CPC .... G05D 1/0295; G05D 1/0088; G05D 1/02; G05D 1/0219; G05D 1/0278; G05D 2201/0201; A01B 69/00
USPC .......................................................... 701/23
See application file for complete search history.

(56) References Cited

U.S. PATENT DOCUMENTS 6,148,255 A    11/2000  van der Lely
6,732,024 B2    5/2004  Rekow et al.
(Continued)

FOREIGN PATENT DOCUMENTS

JP     1066405 A    3/1998
JP     1139036 A    2/1999
(Continued)

*Primary Examiner* — McDieunel Marc
*Assistant Examiner* — James E Stroud
(74) *Attorney, Agent, or Firm* — The Webb Law Firm

(57) ABSTRACT

A work vehicle cooperation system includes: a master traveling tack calculation unit that calculates a traveling track of a master work vehicle (1P) based on its position; a loop traveling detection unit that detects loop traveling in a loop work area (B); a redirection traveling target calculation unit that calculates a redirection traveling start point and a redirection traveling end point (Pc3) of a slave work vehicle (1C) based on a redirection traveling track including a redirection traveling start point (Pp1) and a redirection traveling end point of redirection traveling of the master work vehicle (1P); and a loop work traveling target calculation unit that calculates a target traveling position in loop work traveling of the slave work vehicle (1C) for the redirection traveling end point (Pc3) to a next redirection traveling start point (Pc1).

7 Claims, 11 Drawing Sheets

(56) References Cited

U.S. PATENT DOCUMENTS

| | | | | |
|---|---|---|---|---|
| 8,154,227 B1* | 4/2012 | Young | ............... | A63H 19/24 318/255 |
| 2008/0119965 A1* | 5/2008 | McCrary | ............... | B60C 7/00 701/2 |
| 2010/0312428 A1* | 12/2010 | Roberge | ............... | A01B 69/007 701/23 |
| 2011/0112730 A1 | 5/2011 | Rekow | | |
| 2012/0215410 A1* | 8/2012 | McClure | ............... | A01B 79/005 701/50 |
| 2013/0213518 A1* | 8/2013 | Bonefas | ............... | A01D 43/073 141/1 |
| 2014/0224377 A1* | 8/2014 | Bonefas | ............... | A01D 43/073 141/1 |
| 2014/0324291 A1* | 10/2014 | Jones | ............... | E02F 9/2045 701/41 |
| 2015/0286218 A1* | 10/2015 | Shani | ............... | B62B 5/0083 701/2 |

FOREIGN PATENT DOCUMENTS

| | | |
|---|---|---|
| JP | 11266608 A | 10/1999 |
| JP | 200014208 A | 1/2000 |
| JP | 2001507843 A | 6/2001 |

* cited by examiner

WORK VEHICLE COOPERATION SYSTEM

CROSS-REFERENCE TO RELATED APPLICATIONS

This application is the United States national phase of International Application No. PCT/JP2015/058227 filed Mar. 19, 2015, and claims priority to Japanese Patent Application No. 2014-067006 filed Mar. 27, 2014, the disclosures of which are hereby incorporated in their entirety by reference.

TECHNICAL FIELD OF THE INVENTION

The present invention relates to a work vehicle cooperation system in which a master work vehicle (parent work vehicle) and an unmanned-navigation type slave work vehicle (child work vehicle) that follows the master work vehicle perform ground work.

BACKGROUND OF THE INVENTION

A vehicle control system that sequentially determines target traveling positions based on the actual traveling position of a master work vehicle and navigates a slave work vehicle toward the target traveling positions is known from Patent Document 1. In this vehicle control system, control modes are disclosed, such as one in which the slave work vehicle is controlled to follow the master work vehicle so as to maintain offset amounts in X (longitude) and Y (latitude) directions set for the master work vehicle, and one in which the slave work vehicle is controlled to follow the master work vehicle, using a traveling route that is obtained by translating a traveling track of the master work vehicle by the work width as a target traveling route.

The following control of Patent Document 1 is intended for work performed on work ground with a large area, rather than ground work performed on work ground such as a field with a relatively small area that is bounded by a ridge or the like. The ground work on such work ground (agricultural fields), namely, ground work for agricultural purposes is performed using back and forth traveling in which the vehicles travel while repeatedly performing straight work traveling and U-turns in the central area of the work ground, and loop traveling in which the vehicles perform work while traveling in a loop in a loop work area, which is defined as the perimeter of the U-turn work area. Accordingly, the work ground is divided in advance into the U-turn work area and the loop work area. The central work traveling, which corresponds to work traveling in the U-turn work area, and the loop traveling, which corresponds to work traveling in the loop work area, use different algorithms for redirection and navigation.

It is known from, for example, Patent Document 2 that a single unmanned work vehicle performs ground work such as cultivation work with respect to the U-turn work area and the loop work area. However, it is impossible to realize ground work constituted by the central work traveling and the loop traveling with the work vehicle cooperation control in which a slave work vehicle follows a master work vehicle, only by combining the control disclosed in Patent Documents 1 and 2.

PRIOR ART LITERATURE

Patent Documents

Patent Document 1: U.S. Pat. No. 6,732,024 (U.S. Pat. No. 6,732,024 B2)

Patent Document 2: Japanese Patent Un-Examined Publication No. H11-266608 (JP H11-266608 A)

SUMMARY OF THE INVENTION

Problem to be Solved by the Invention

In view of the above-described circumstances, there has been a demand for a system has been demanded for realizing ground work traveling in a work area constituted by a U-turn work area and a loop work area, with the work vehicle cooperation control in which a slave work vehicle follows a master work vehicle.

Means for Solving Problem

A system according to the present invention relates to a work vehicle cooperation system in which a master work vehicle and an unmanned-navigation type slave work vehicle that follows the master work vehicle perform ground work, including: a master position detection module that detects a position of the master work vehicle; a slave position detection module that detects a position of the slave work vehicle; a master traveling track calculation unit that calculates a traveling track of the master work vehicle based on the position of the master work vehicle; a loop traveling detection unit that detects loop traveling including loop work traveling and redirection traveling, which is constituted by forward traveling and backward traveling, the loop traveling being performed in a loop work area, which is defined as the perimeter of a U-turn work area, the U-turn work area being an area in which work is performed by repeating straight work traveling and U-turns; a redirection traveling target calculation unit that calculates a redirection traveling start point and a redirection traveling end point of the slave work vehicle, based on a ground work width of the master work vehicle, a ground work width of the slave work vehicle, and a redirection traveling track that includes a redirection traveling start point and a redirection traveling end point of redirection traveling of the master work vehicle; a loop work traveling target calculation unit that calculates a target traveling position in loop work traveling of the slave work vehicle from the redirection traveling end point to a next redirection traveling start point, based on the ground work width of the master work vehicle, the ground work width of the slave work vehicle, and a loop work traveling track of the master work vehicle; and a navigation control unit that navigates the slave work vehicle in an unmanned manner based on the redirection traveling start point, the redirection traveling end point, and the target traveling position.

According to this configuration, the loop traveling of the master work vehicle in the loop work area is divided into the redirection traveling and the loop work traveling. First, the redirection traveling start point and the redirection traveling end point of the slave work vehicle are calculated based on a redirection traveling track of the slave work vehicle that is estimated based on the redirection traveling track of the master work vehicle from the redirection traveling start point, which serves as a start point of the redirection traveling, to the redirection traveling end point, taking into consideration the ground work widths. Note that the redirection traveling end point serves as the start point of the loop work traveling in which ground work is actually performed. Then, when the target traveling position that leads the slave work vehicle from the redirection traveling start point to the redirection traveling end point is calculated, the slave work vehicle is navigated based on this target traveling position, so as to arrive at the redirection traveling end point. This redirection traveling end point serves also as the loop work start point. Therefore, the slave work vehicle performs, from the loop work start point, normal follow work traveling of following the work track of the master work vehicle so as to maintain a predetermined overlap amount. Accordingly, also in the loop traveling in the loop work area, efficient ground work with the ground work width of the master work vehicle and the ground work width of the slave work vehicle is realized.

Because the redirection traveling is preparation traveling for shifting to the loop work start point, the redirection traveling is traveling that is performed in the non-working state and includes forward traveling and backward traveling. Accordingly, in an embodiment of the present invention, a shift point from the working state to the non-working state in the redirection traveling can be regarded as the redirection traveling start point of the master work vehicle, and a shift point from the non-working state to the working state in the redirection traveling can be regarded as redirection traveling end point of the master work vehicle. The redirection traveling start point and the redirection traveling end point of the slave work vehicle are calculated based on the redirection traveling start point and the redirection traveling end point of the master work vehicle.

In order to more reliably detect the redirection traveling of the master work vehicle, it is preferable to take the direction of the forward traveling and the direction of the backward traveling into consideration. Accordingly, in a preferred embodiment of the present invention, the loop traveling detection unit may be configured to recognize the redirection traveling of the master work vehicle based on the traveling track of the master work vehicle in the non-working state.

In the redirection traveling, the work vehicles arrive at the start points of the loop work traveling by the forward traveling and the subsequent backward traveling for redirection in the non-working state. At that time, since no work is performed, backward traveling of the slave work vehicle does not need to follow the traveling track of the master work vehicle if the slave work vehicle can only arrive at the redirection traveling end point serving as the start point of the loop work traveling. For example, the backward traveling of the slave work vehicle can be made straight toward the redirection traveling end point in the shortest distance. Accordingly, in a preferred embodiment of the present invention, the backward traveling to the redirection traveling end point in the redirection traveling of the slave work vehicle is performed irrespective of the traveling track of the master work vehicle.

The functional units for causing the slave work vehicle to follow the preceding master work vehicle are preferably accommodated in a single control unit. Accordingly, for this, in a preferred embodiment of the present invention, the slave position detection module and the navigation control unit are mounted on the slave work vehicle, the master position detection module, the master traveling track calculation unit, the loop traveling detection unit, the redirection traveling target calculation unit, and the loop work traveling target calculation unit are mounted on the master work vehicle, and the slave work vehicle and the master work vehicle are connected to each other so as to be capable of data transmission. According to this configuration, only slight modification is needed for the slave work vehicle, and thus the present invention is applicable to a system that uses a plurality of slave work vehicles.

In another preferred embodiment, the slave position detection module and the navigation control unit are mounted on the slave work vehicle, and the master position detection module is mounted on the master work vehicle, the master traveling track calculation unit, the loop traveling detection unit, the redirection traveling target calculation unit, and the loop work traveling target calculation unit are constructed in a separate control unit, and the separate control unit, the slave work vehicle, and the master work vehicle are connected to one another so as to be capable of data transmission. In this configuration, since the main functions that realize the present invention are constructed in the control unit that is separate from the work vehicles, only slight modification is needed for the master work vehicle and the slave work vehicle. By connecting the master work vehicle, the slave work vehicle, and the control unit using Wi-Fi, telephone lines, or the like so that data transmission is possible, it is possible to use the work vehicle cooperation system as a cloud system.

EMBODIMENTS OF THE INVENTION

A basic principle of a slave work vehicle following a master work vehicle (parent work vehicle) 1P in a loop work traveling area will be described with reference to FIG. 1 before describing specific embodiments of a work vehicle cooperation system according to the present invention. In this work vehicle cooperation system, the manned-navigation type master work vehicle 1P and an unmanned-navigation type slave work vehicle (child work vehicle) 1C that follows this master work vehicle 1P perform ground work. In other words, by the slave work vehicle 1C traveling while following the preceding master work vehicle 1P behind the master work vehicle 1P from the left, ground work is realized in the width that is obtained by summing up the work width of the master work vehicle 1P and the work width of the slave work vehicle 1C (actually, an overlap with a very small width occurs therebetween).

Figure 1:
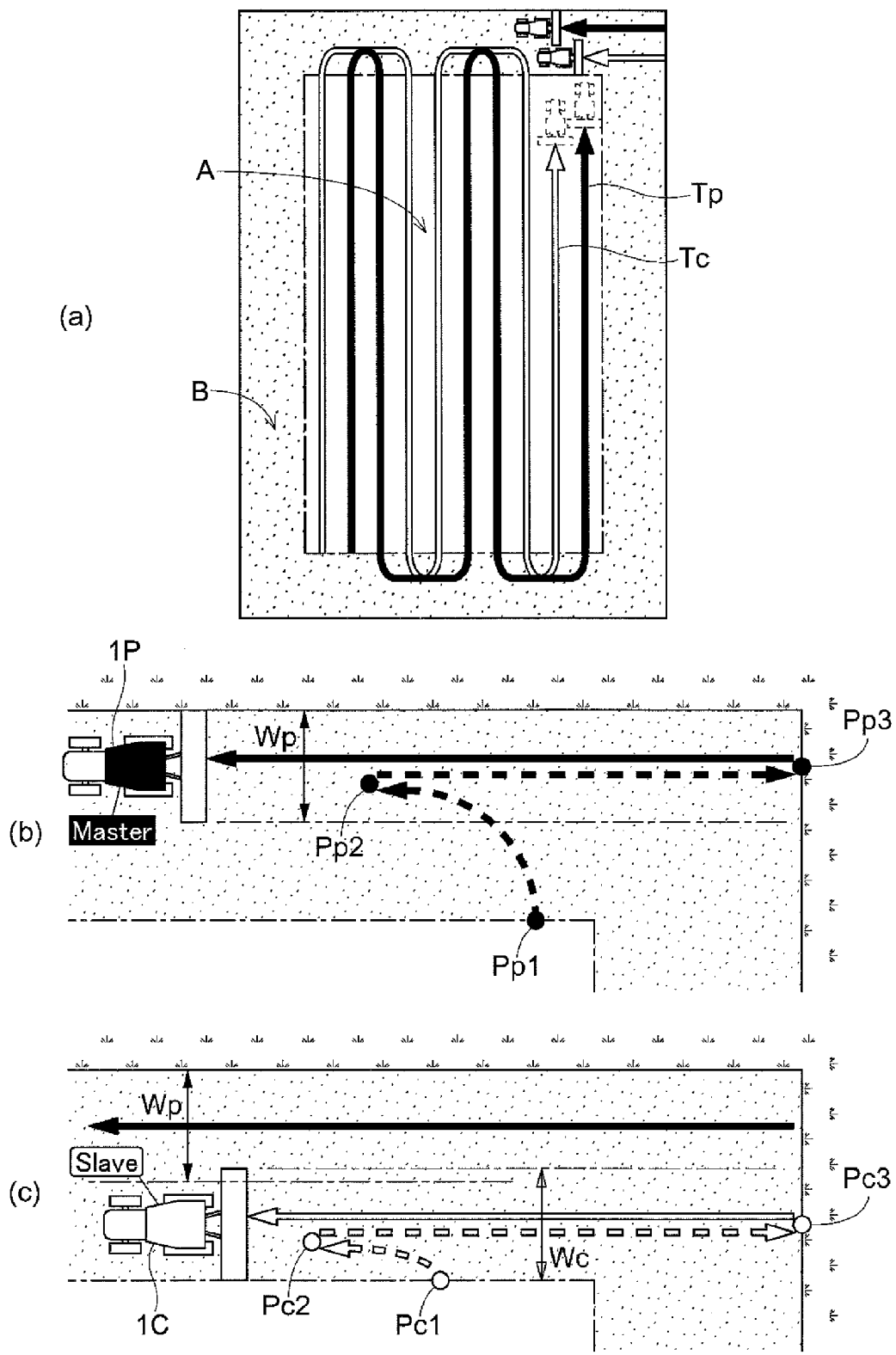
FIG. 1 illustrates schematic diagrams of a basic principle of a slave work vehicle (child work vehicle) following a master work vehicle (parent work vehicle) in a loop work traveling area according to a work vehicle cooperation system of the present invention, wherein (a) in FIG. 1 (referred to as "FIG. 1(a)" also) shows traveling tracks of the master work vehicle and the slave work vehicle on the entire work ground; (b) in FIG. 1 (referred to as "FIG. 1(b)" also) shows traveling tracks of redirection traveling and loop work traveling of the master work vehicle; and (c) in FIG. 1 (referred to as "FIG. 1(c)" also) shows traveling tracks of redirection traveling and loop work traveling of the slave work vehicle.

The ground work area shown in FIG. 1(a) is an agricultural field bounded externally by a ridge. This agricultural field, although it is shown in a simplified manner, is divided into a rectangular U-turn work area A, in which work is performed by repeating straight work traveling and U-turns, and a square ring-shaped loop work area B, which is defined as the perimeter of this U-turn work area A. This work ground division is commonly made in agricultural field work, and the loop work area B is referred to also as headland area. In this example, cultivation work using tractors is taken as an example of ground work, and work with respect to the U-turn work area A is performed first and work with respect to the loop work area B is performed thereafter. At the time of shifting from the work in the U-turn work area A to the work in the loop work area B, redirection traveling is performed from a work end point in the U-turn work area A toward a work start point in the loop work area B. Note that in FIG. 1, distinction is made such that the traveling track of the master work vehicle 1P is denoted by the bold black line, the traveling track of the slave work vehicle 1C is denoted by the bold white line, and the redirection traveling track is denoted by dotted lines.

The slave work vehicle 1C needs to follow the redirection traveling of the master work vehicle 1P that is performed in an appropriate route so that loop work is efficiently performed. The cooperation control that is executed at that time will be described below.

First, as shown in FIG. 1(b), the master work vehicle 1P starts in a non-working state (with a cultivation apparatus raised) from a redirection traveling start point Pp1, which serves as a work end point in the U-turn work area A, and travels forward while turning so that the rear end of the work vehicle faces a loop work start point (serving also as a redirection traveling end point) Pp3 that is set at one corner section of the agricultural field, and is stopped at a redirection point Pp2 at which the rear end of the work vehicle faces the loop work start point. Then, the master work vehicle 1P travels backward to the redirection traveling end point Pp3, which serves as the loop work start point. After the completion of the redirection traveling, the master work vehicle 1P travels forward in the loop work area B in a working state (with the cultivation apparatus lowered). This loop work traveling is performed so as to create a substantially straight traveling track.

When it is detected that the master work vehicle 1P has performed the redirection traveling based on the above-described traveling track of the master work vehicle 1P, a redirection traveling start point Pc1 and a redirection traveling end point Pc3 of the slave work vehicle 1C are calculated, as shown in FIG. 1(c), based on the traveling track and the ground work widths (hereinafter, abbreviated simply as "work widths" and denoted respectively by "Wp" and "Wc" in FIG. 1) of the master work vehicle 1P and the slave work vehicle 1C. When the redirection traveling start point Pc1 and the redirection traveling end point Pc3 have been calculated, a stop point (redirection point) Pc2 of the turning and forward traveling in the same direction as that of the redirection traveling of the master work vehicle 1P is also calculated, and the slave work vehicle 1C is caused to travel forward while turning in the non-working state to this stop point (redirection point) Pc2. In this case, the slave work vehicle 1C is prohibited from turning and traveling forward until interference with the master work vehicle 1P that is performing the loop work traveling is prevented. The target traveling position in the backward traveling of the slave work vehicle 1C from the stop point (redirection point) Pc2 of the turning and forward traveling to the redirection traveling end point Pc3 is calculated irrespective of the traveling track of the turning and backward traveling of the master work vehicle 1P, under the condition that the rut of the slave work vehicle 1C does not enter the loop work width of the master work vehicle 1P. The target traveling position of loop work traveling from the loop work traveling start point, which serves also as the redirection traveling end point Pc3, is calculated based on the work width of the master work vehicle 1P, the work width of the slave work vehicle 1C, and the loop work traveling track of the master work vehicle 1P, under the condition that a predetermined overlap in the work width of both vehicles is maintained. The loop work traveling of the slave work vehicle 1C is executed based on the calculated target traveling position in the loop work traveling.

In the example shown in FIG. 1, the master work width, which is the work width of the master work vehicle 1P, and the slave work width, which is the work width of the slave work vehicle 1C, may be the same or different from each other. An amount of offset between the positions of the master work vehicle 1P and the slave work vehicle 1C in the direction perpendicular to the traveling direction is given as "(the master work width+the slave work width)/2" ideally, but, for example, an overlap of about several tens of centimeters is set in order to prevent the ground from remaining uncultivated due to an error in following.

Figure 2:
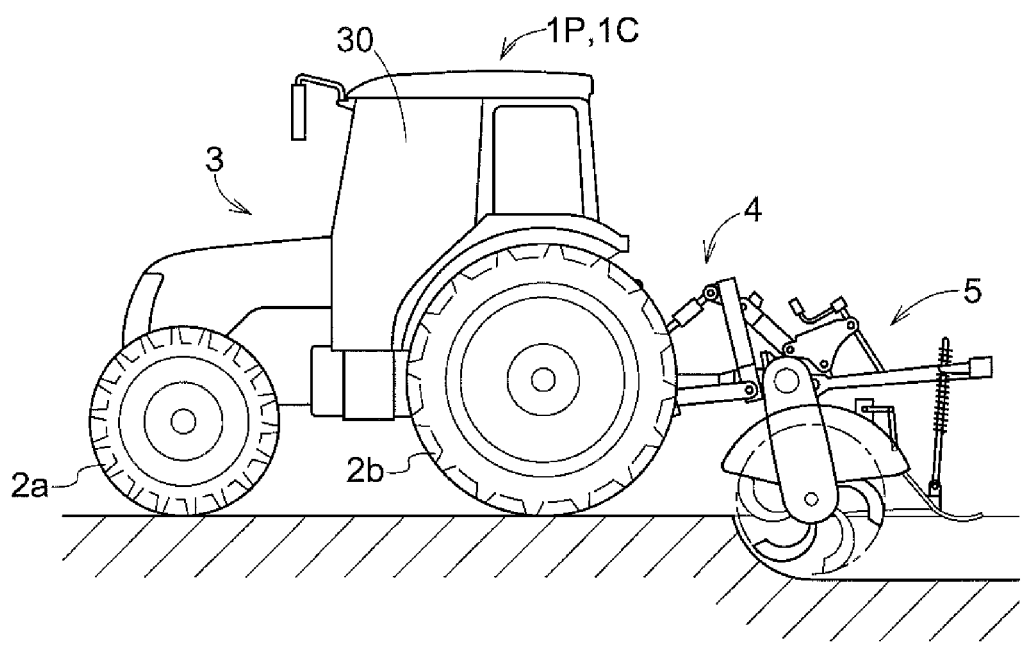
FIG. 2 is a side view of a tractor provided with a cultivation apparatus according to an embodiment of the work vehicle cooperation system, the tractor serving as a work vehicle.

Hereinafter, a specific embodiment of the work vehicle cooperation system of the present invention will be described. In this embodiment, the work vehicles are, as shown in FIG. 2, tractors each provided with a cultivation apparatus 5 that serves as a ground work implement and cultivates a field bounded by a ridge. The cultivation apparatus 5 is mounted on the rear of a vehicle body 3 via a hydraulic lifting mechanism 4. The master tractor 1P serving as the master work vehicle 1P and the slave tractor 1C serving as the slave work vehicle 1C have substantially the same shape, and each are provided with a steering section 30 in the center of its vehicle body 3 that is supported by front wheels 2a and rear wheels 2b. The steering sections 30 of the master tractor 1P and the slave tractor 1C include a conventional steering wheel and various conventional operational levers, a seat on which a driver is seated, and the like. At the time of execution of following control according to the work vehicle cooperation system of the present invention, the master tractor 1P is navigated by the driver, and the slave tractor 1C is navigated in an unmanned manner.

Figure 3:
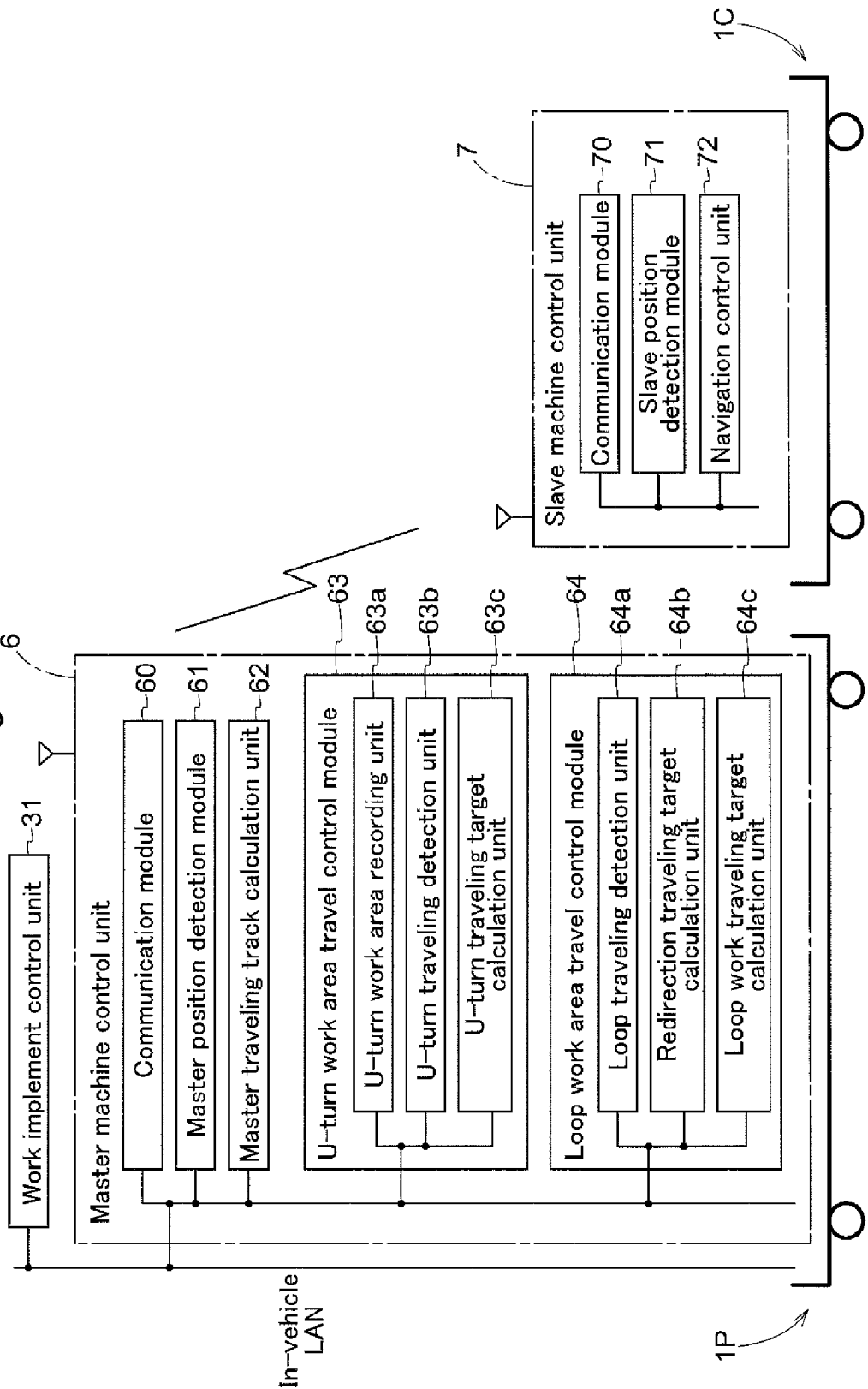
FIG. 3 is a functional block diagram illustrating functional units constituting the work vehicle cooperation system.

As shown in FIG. 3, in this embodiment, an electronic control unit for configuring the work vehicle cooperation system is divided into a master machine control unit 6, which is mounted on the master tractor 1P, and a slave machine control unit 7, which is mounted on the slave tractor 1C. The master machine control unit 6 and the slave machine control unit 7 are respectively provided with communication modules 60 and 70 so as to be capable of wireless data transmission with each other.

The master machine control unit 6 further includes functional units such as a master position detection module 61, a master traveling track calculation unit 62, a U-turn work area travel control module 63, and a loop work area travel control module 64. These functional units may operate in cooperation with hardware, but are realized substantially by activation of computer programs.

The master position detection module 61 uses GPS to detect its own position, that is, the position of the master tractor 1P. The master traveling track calculation unit 62 calculates the traveling track of the master tractor 1P based on the position (directional coordinates) detected by the master position detection module 61, and records the calculated traveling track. Note that in this embodiment, the master position detection module 61 and a slave position detection module 71, which will be described later, use GPS for position detection, but the present invention is not limited to this and may use another method for detecting a vehicle position, such as, for example, a direction sensor or a gyro sensor.

The U-turn work area travel control module 63 is a control module for controlling traveling in the U-turn work area A, and includes a U-turn work area recording unit 63a, a U-turn traveling detection unit 63b, and a U-turn traveling target calculation unit 63c. The U-turn work area recording unit 63a records directional coordinates that specifies the outer shape of the U-turn work area A. The U-turn traveling detection unit 63b detects U-turns of the master tractor 1P and the slave tractor 1C in the U-turn work area A. The U-turns are redirections that are needed between the substantially straight back traveling and forth traveling in the working state in the U-turn work area A, and are made in the non-working state in the loop work area B. The U-turn traveling target calculation unit 63c calculates the target traveling position of the slave tractor 1C, based on the cultivation width of the master tractor 1P, the cultivation width of the slave tractor 1C, the work traveling track of the master tractor 1P, and the position of the slave tractor 1C, taking into consideration an overlap in the cultivation width of both tractors. Accordingly, the U-turn traveling target calculation unit 63c has a back and forth traveling route calculating function to calculate the straight back and forth traveling routes for the slave tractor 1C in the U-turn work area A, and a U-turn traveling route calculating function to calculate the U-turn traveling route for the slave tractor 1C in the loop work area B based on a predetermined U-turn traveling route calculation algorithm. This U-turn traveling route calculation algorithm essentially calculates the traveling route for the slave tractor 1C that connects a U-turn start point Q1 and a U-turn end point Q2 for the slave tractor 1C that are calculated based on a U-turn start point P1 and a U-turn end point P2 for the master tractor 1P, taking into consideration the radius of the turn of the slave tractor 1C.

The U-turn work area travel control module 63 transmits the calculated target traveling position of the slave tractor 1C to the slave machine control unit 7 via the communication module 60.

The loop work area travel control module 64 is a control module for controlling traveling in the loop work area B, and includes a loop traveling detection unit 64a, a redirection traveling target calculation unit 64b, and a loop work traveling target calculation unit 64c. The loop traveling detection unit 64a detects redirection traveling, which includes forward and backward traveling, and loop traveling, which includes loop work traveling, of the master tractor 1P and the slave tractor 1C in the loop work area B. For the detection, the loop traveling detection unit 64a uses positional coordinates for specifying the outer shape of the U-turn work area A, and positional coordinates for specifying the outer shape of the agricultural field that is a target for work. The redirection traveling target calculation unit 64b calculates the redirection traveling start point and the redirection traveling end point of the slave tractor 1C, based on the work width of the master tractor 1P, the work width of the slave tractor 1C, the redirection traveling track that includes the redirection traveling start point and the redirection traveling end point of the redirection traveling of the master tractor 1P. The loop work traveling target calculation unit 64c calculates the target traveling position of the slave tractor 1C in the loop work traveling from the redirection traveling end point to the next redirection traveling start point, based on the work width of the master tractor 1P, the work width of the slave tractor 1C, and the loop work traveling track of the master tractor 1P. The loop work area travel control module 64 transmits the calculated target traveling position of the slave tractor 1C to the slave machine control unit 7 via the communication module 60.

The slave machine control unit 7 includes a communication module 70, the slave position detection module 71, and a navigation control unit 72. Similarly to the master position detection module 61, the slave position detection module 71 uses GPS to detect its own position, that is, the position (directional coordinates) of the slave tractor 1C. The acquired positional data on the slave tractor 1C is transmitted to the master machine control unit 6 via the communication module 70. The navigation control unit 72 controls the steering orientation of the front wheels 2a of the slave tractor 1C and driving of the rear wheels 2b thereof based on the target traveling position wirelessly transmitted from the master machine control unit 6, and navigates the slave tractor 1C in an unmanned manner to target traveling positions that are set sequentially.

In the traveling in the U-turn work area A, the cultivation apparatus 5 is raised when entering a non-working U-turn from the work traveling and is lowered when entering the work traveling from the U-turn traveling. This raising/lowering of the cultivation apparatus 5 is realized by the raising/lowering operation of the lifting mechanism 4 in response to a control instruction from a work implement control unit 31 mounted on the master tractor 1P. In this embodiment, the work implement control unit 31 is connected to the master machine control unit 6 via an in-vehicle LAN, and the operation instructions of the work implement control unit 31 that are given to the lifting mechanism 4 are managed by the U-turn work area travel control module 63 and the loop work area travel control module 64. Therefore, the U-turn traveling detection unit 63b can also check the start of the U-turn at a timing at which a raising instruction is output to the lifting mechanism 4, and can check the end of the U-turn at a timing at which a lowering instruction is output. Furthermore, in the traveling in the loop work area B, the cultivation apparatus 5 is raised at the time of the redirection traveling, and is lowered at the time of shift from the redirection traveling to the loop work traveling. Therefore, the loop traveling detection unit 64*a* checks the start of the redirection traveling at a timing at which a raising instruction is output to the lifting mechanism 4, and checks the end of the redirection traveling at a timing at which a lowering instruction is output thereto.

Figure 4:
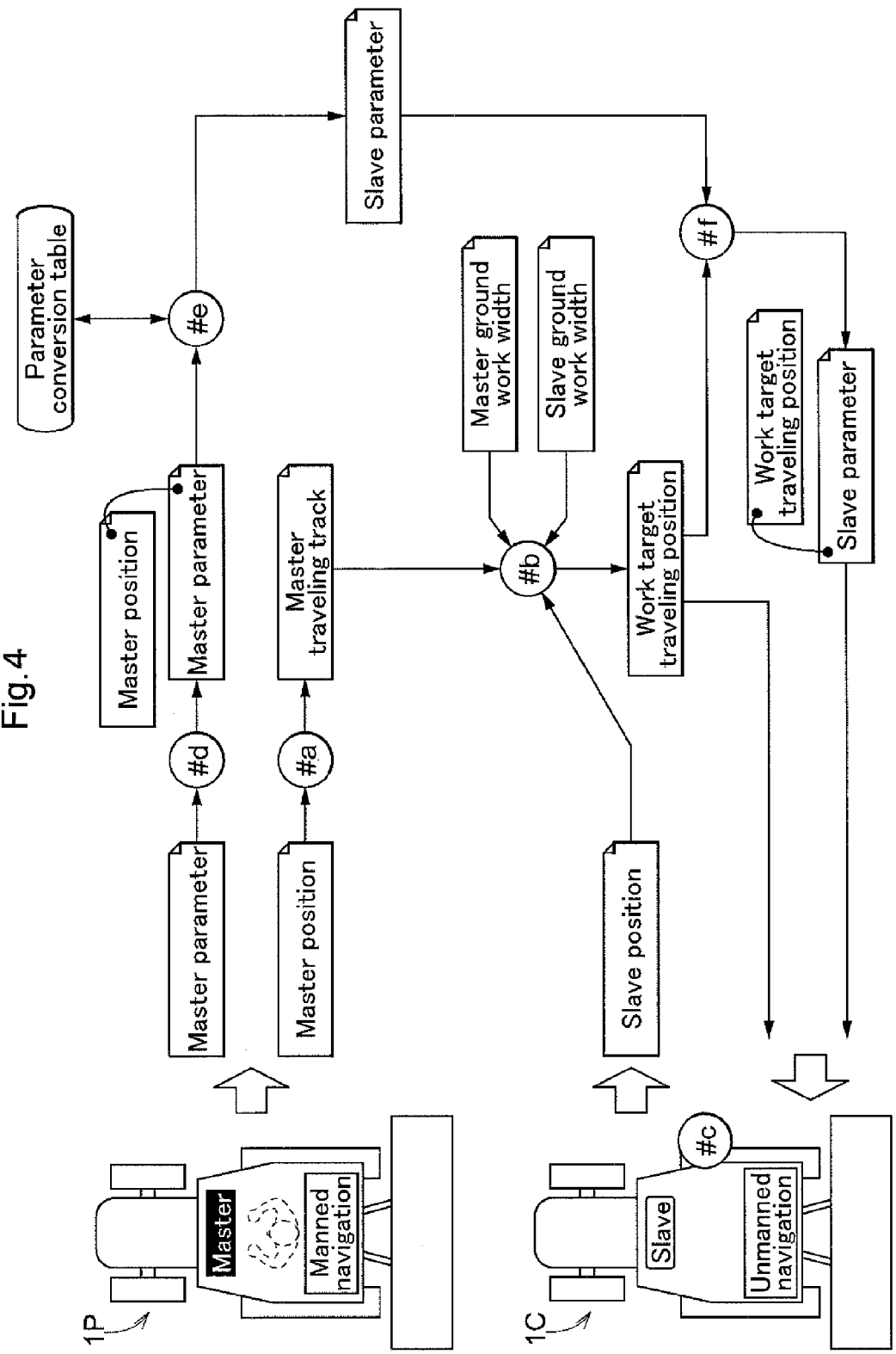
FIG. 4 is a schematic diagram illustrating basic data transmission in straight work traveling.
Figure 5:
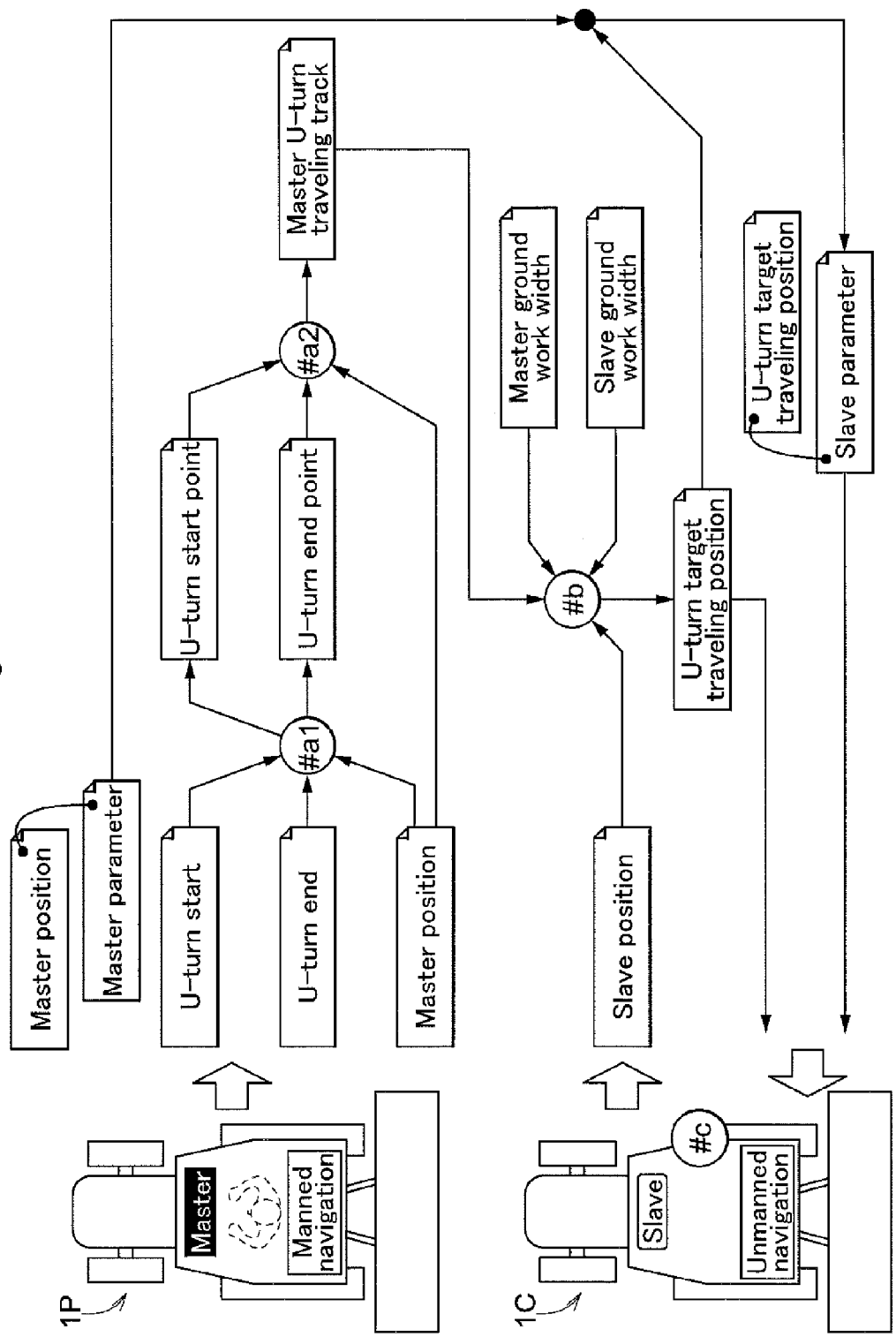
FIG. 5 is a schematic diagram illustrating basic data transmission in U-turn traveling.
Figure 6:
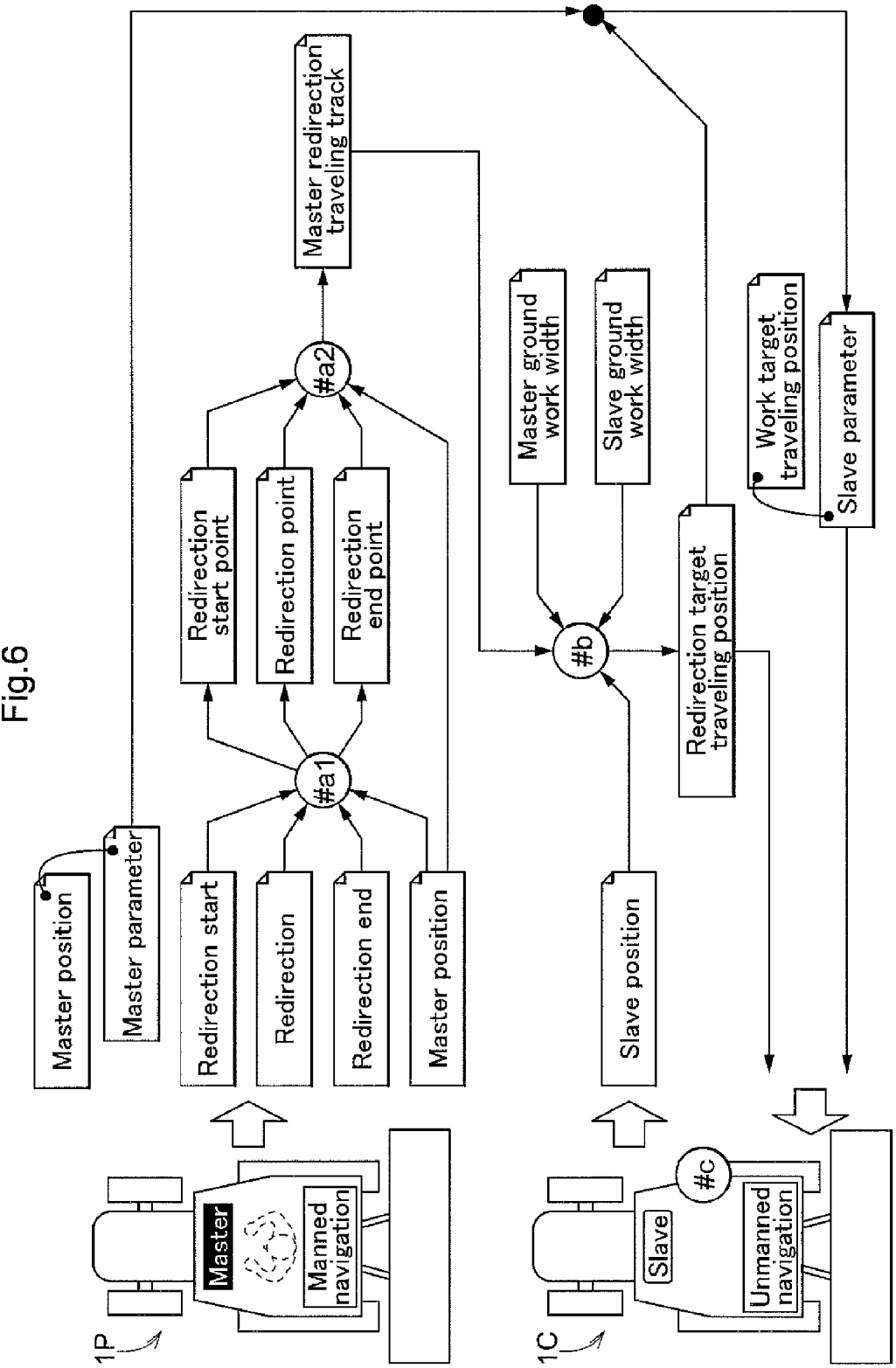
FIG. 6 is a schematic diagram illustrating basic data transmission in redirection traveling.

The following will describe the basic flows of data in the cooperation control between the manned-navigation type master tractor 1P and the unmanned-navigation type slave tractor 1C with reference to FIGS. 4, 5, and 6. FIG. 4 schematically shows the flow of data in the cooperation control for work traveling that leaves a substantially straight traveling track. FIG. 5 schematically shows the flow of data in the cooperation control for U-turn traveling. FIG. 6 schematically shows the flow of data in the cooperation control for redirection traveling.

As shown in FIG. 4, in the cooperation control for the work traveling that leaves a straight traveling track, a master traveling track is calculated based on master positions indicating the actual traveling positions of the master tractor 1P that were generated in a predetermined sampling period (#a). Based on the calculated master traveling track and a slave position that indicates the actual traveling position of the slave tractor 1C at each time, the work target traveling position is further calculated (#b) with further consideration given to the width of ground work of the master work vehicle (master ground work width), the width of ground work of the slave work vehicle (slave ground work width), and the amount of overlap in the work width between both vehicles. This calculated work target traveling position serves as a navigation control target value, and the slave tractor 1C is navigated in an unmanned manner so as to perform ground work with a wide width in cooperation with the master tractor 1P (#c). Note that operating information on the traveling and work that were performed by an driver during the travel of the master tractor 1P is generated as travel/work parameters (master parameters), is converted into travel/work parameters (slave parameters) for the slave tractor 1C, and then is used for the traveling control and work control for the slave tractor 1C.

Figure 8:
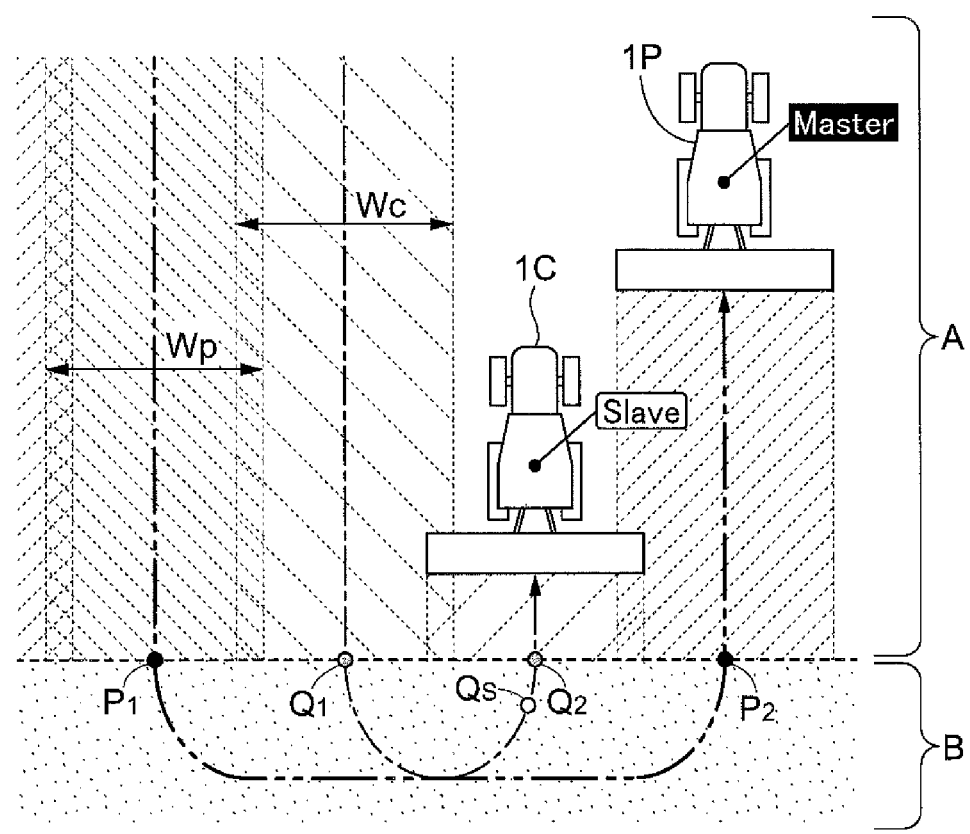
FIG. 8 is a schematic diagram illustrating traveling tracks of the master work vehicle and the slave work vehicle in work traveling and U-turn traveling in the U-turn work area.

As shown in FIG. 5, in the cooperation control in the U-turn traveling whose traveling tracks are shown in FIG. 8, the U-turn start point (indicated by P1 in FIG. 8) and the U-turn end point (indicated by P2 in FIG. 8) of the master tractor 1P is calculated based on the U-turn start operation and the U-turn end operation of the master tractor 1P that are associated with the master position (#a1). Note that data on the operation such as the U-turn start operation or the U-turn end operation is generated as the travel/work parameters (master parameters) in the master tractor 1P. Taking into consideration both types of the calculated data, and the work width of the master work vehicle, and the work width of the slave work vehicle, a U-turn traveling route is generated (#a2). At the time of generation of the U-turn traveling route, data on the shape of the loop work area B is taken into consideration. The U-turn target traveling position is calculated based on the generated slave U-turn traveling route data and a slave work vehicle position at each time (#b). This calculated work target traveling position serves as a navigation control target value, and the slave tractor 1C is navigated in an unmanned manner so as to perform appropriate U-turn traveling in the U-turn area (#c).

As shown in FIG. 6, at the time of the redirection traveling whose traveling tracks are shown in FIGS. 1(*b*) and 1(*c*) in the loop work area B, the redirection traveling start point, the redirection point, and the redirection traveling end point (that are respectively denoted by Pp1, Pp2, and Pp3 in FIG. 1(*b*)) of the master tractor 1P are calculated in association with the master position (#a1), based on the traveling operation of the master tractor 1P such as stopping, forward traveling, and backward traveling in the redirection traveling of the master tractor 1P. Note that also here, the travel operations such as stopping, forward traveling, and backward traveling are generated as the travel/work parameters (master parameters) in the master tractor 1P. The redirection traveling route of the slave tractor 1C is created, taking into consideration the respective calculated points of the redirection traveling, the master work width, and the slave work width (#a2). The redirection target traveling position is calculated based on the created redirection traveling route data and the slave position at each time (#b). This calculated redirection target traveling position serves as a navigation control target value, and the slave tractor 1C is navigated in an unmanned manner so as to perform appropriate redirection traveling (#c).

Figure 7:
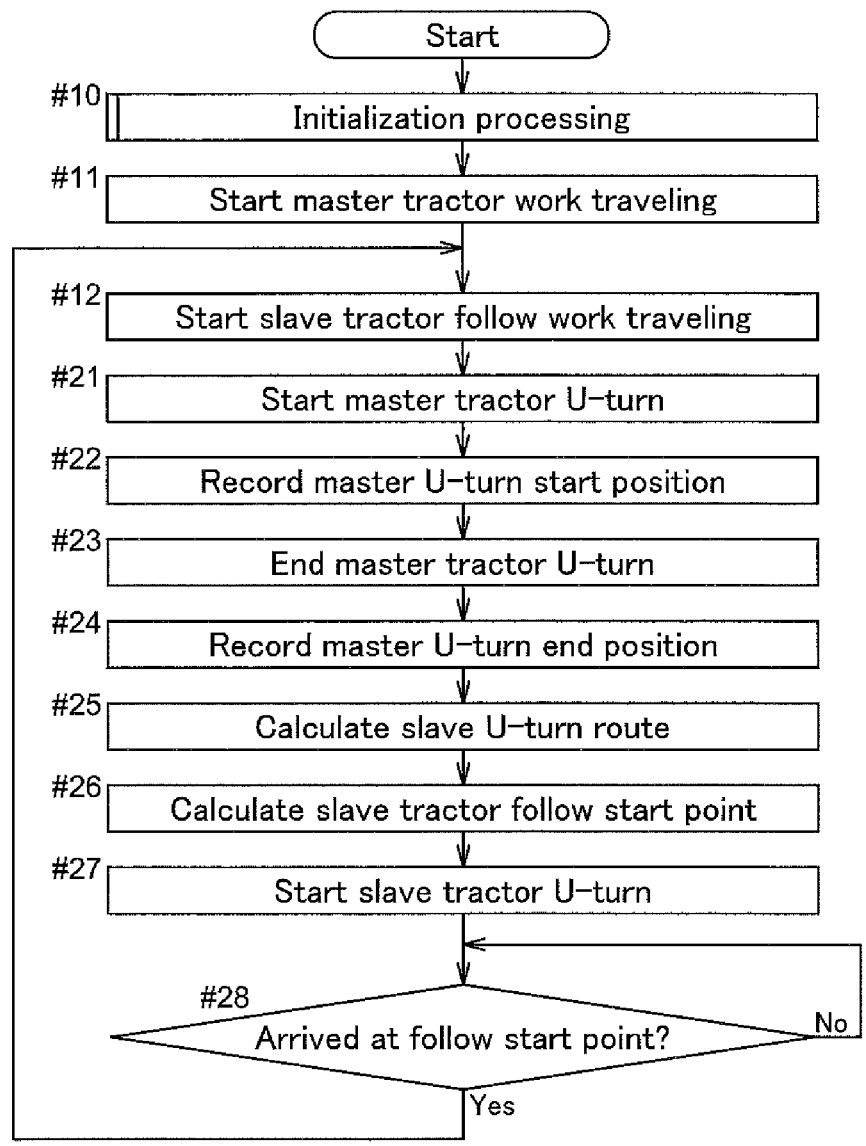
FIG. 7 is a flowchart illustrating an example of travel control on the U-turn work ground.

The following will describe an example of the flow of the cooperative travel control between the master tractor 1P and the slave tractor 1C according to the embodiment. FIG. 7 illustrates the flowchart of the cooperative travel control between the master tractor 1P and the slave tractor 1C that is executed in the U-turn work area A, and FIG. 8 illustrates traveling tracks of both tractors at that time. FIGS. 9 to 14 are schematic diagrams illustrating travel patterns of the master tractor 1P and the slave tractor 1C that are executed in the loop work area B.

When the cooperation control is started, initialization processing is performed first (#10). In this initialization processing, the U-turn work area A in which cultivation work is to be performed while the straight work traveling and U-turns are repeatedly performed, and the loop work area B in the perimeter of the U-turn work area A are set and recorded, based on, for example, the shape of an agricultural field in which cultivation work is to be performed. Note that the loop work area B is used also as an area for non-working U-turn traveling performed at the time of cultivation work with respect to the U-turn work area A. Note that the U-turn work area A is simply referred to also as a central area A since the U-turn work area A is commonly located in the center of an agricultural field, and the loop work area B is simply referred to also as a peripheral area B since the loop work area B is located near the periphery of the agricultural field.

The work traveling (substantially straight traveling) of the master tractor 1P is started in the central area A (#11). After a predetermined time, the follow work traveling of the slave tractor 1C is started (#12). Accordingly, cooperative cultivation work with the work width by the master tractor 1P and the work width by the slave tractor 1C is performed. Then, when the master tractor 1P arrives at the peripheral area B as shown in FIG. 8, the cultivation apparatus 5 is raised, and the U-turn traveling of the master tractor 1P is started (#21). The position of the master tractor 1P at that time is recorded as a master U-turn start point P1 (#22). When the master tractor 1P performs U-turn traveling and enters the central area A again, the cultivation apparatus 5 is lowered and the work traveling of the master tractor 1P is restarted (#23). The position of the master tractor 1P at that time is recorded as a master U-turn end point P2 (#24). When the master U-turn start point P1 and the master U-turn end point P2 have been recorded, a slave U-turn start point Q1 and a slave U-turn end point Q2 of the slave tractor 1C are calculated. In the shown corresponding peripheral area B, the slave U-turn start point Q1 is a position that is shifted from the master U-turn start point P1 with consideration given to a distance in the lateral direction between the master tractor 1P and the slave tractor 1C and an amount of overlap therebetween. The slave U-turn end point Q2 is a position between the master U-turn end point P2 and the slave U-turn start point Q1, and is assumed to be an intermediate position in, for example, FIG. 8. Note that when performing a U-turn on the opposite side, although it is not shown, the positional relationship between the master U-turn start point P1/the master U-turn end point P2, and the slave U-turn start point Q1/the slave U-turn end point Q2 is exactly opposite, and the slave U-turn end point Q2 is a position located further outward than the master U-turn end point P2, and is obtained based on the cultivation widths of the master tractor 1P and the slave tractor 1C and the amount of overlap therebetween.

When the slave U-turn start point Q1 and the slave U-turn end point Q2 have been calculated, a slave U-turn traveling route from the slave U-turn start point Q1 toward the slave U-turn end point Q2 is calculated (#25). Furthermore, the position at which the slave tractor 1C has almost reached an orientation in the work traveling direction before the slave U-turn end point Q2 is calculated as a follow start point Qs (#26). That is, the follow start point Qs is a position at which following the master tractor 1P is started, so that the work traveling track of the slave tractor 1C starting from the U-turn end point Q2 exactly corresponds to the work traveling track of the master tractor 1P.

When the slave tractor 1C arrives at the slave U-turn start point Q1, U-turn traveling of the slave tractor 1C is started (#27). In the U-turn traveling of the slave tractor 1C, it is checked whether or not the slave tractor 1C has arrived at the follow start point Qs (#28). When the slave tractor 1C has arrived at the follow start point Qs (Yes at the branch of #28), the U-turn traveling of the slave tractor 1C is ended, and the follow travel of the slave tractor 1C, that is, the work traveling is started again (jumps to #12).

Note that it is not possible to calculate the U-turn end point Q2 (work traveling start point) of the slave tractor 1C unless the U-turn traveling of the master tractor 1P is ended and the work traveling is started, and thus the distance between the master tractor 1P and the slave tractor 1C is set with consideration given to the fact. Stand-by control is incorporated in which, upon arriving at the loop work area B so as to perform U-turn traveling during the U-turn traveling of the master tractor 1P, the slave tractor 1C is stopped at the position at that time and stands by until the master tractor 1P ends the U-turn traveling, but this stand-by control is omitted in this flowchart.

Furthermore, this flowchart is given for the sake of illustration and illustrates an endless loop without an end of the routine, but as interrupt processing, it is actually checked whether or not an instruction that means the end of the cultivation work in this central area A has been input, and then in response to the input of such an instruction, the cooperation control in the loop work, which will be described later, is executed.

Figure 9:
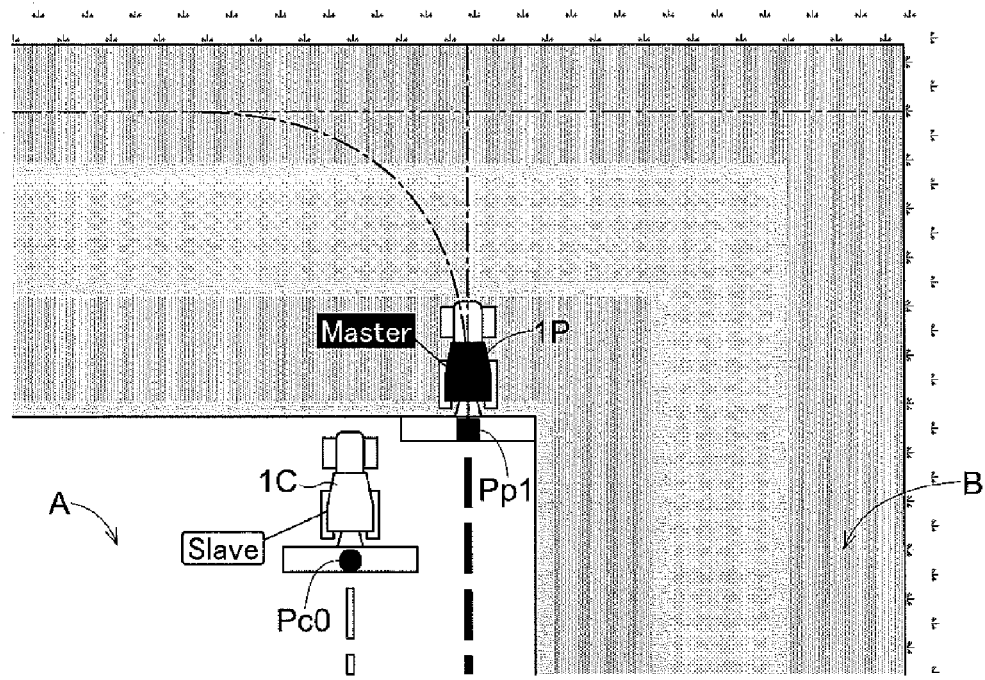
FIG. 9 is a schematic diagram illustrating start positions of the redirection traveling of the master work vehicle and the slave work vehicle, the redirection traveling being performed prior to the loop work traveling.

As shown in FIG. 9, a stop point Pc0 of the slave tractor 1C and the redirection traveling start point Pp1, which serves as a stop point of the master tractor 1P, at the start of the cooperation control in the loop work in the peripheral area B are stop points at the ends of the cultivation work in the central area A. Note that in this embodiment, the work width in the peripheral area B corresponds to the width obtained by three tractors, and requires two rounds of loop work traveling of the master tractor 1P and one round of loop work traveling of the slave tractor 1C.

Figure 10:
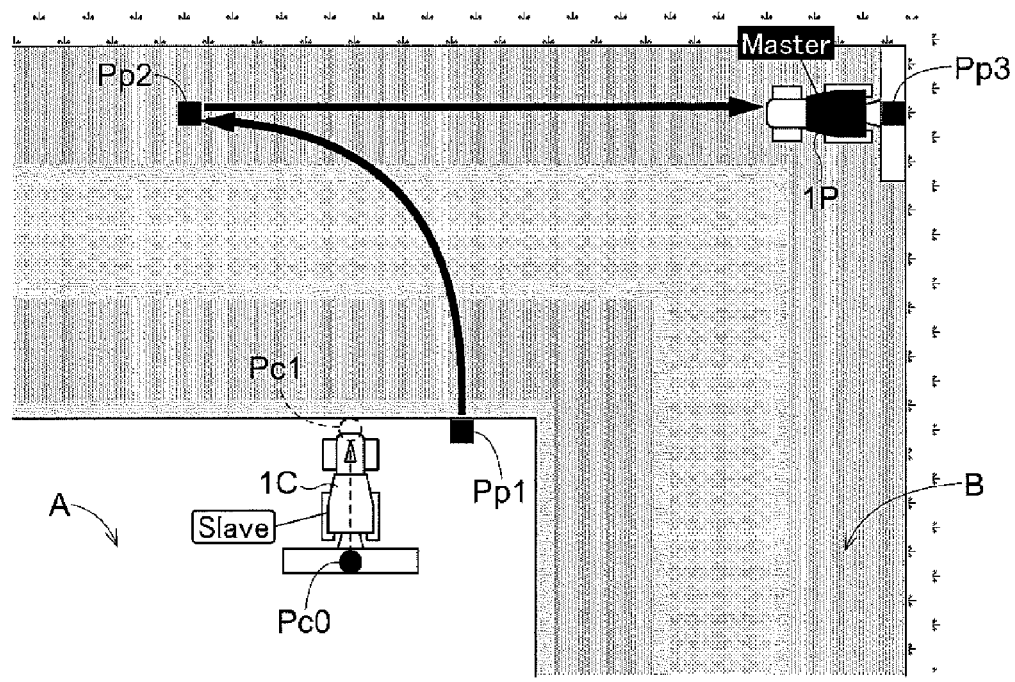
FIG. 10 is a schematic diagram illustrating the redirection traveling of the master work vehicle at the first corner section.

First, the master tractor 1P travels forward while turning to the redirection point Pp2 in an outermost work width zone with its cultivation apparatus 5 raised (in the non-working state), and then travels backward substantially straight so as to arrive at the redirection traveling end point Pp3 (see FIG. 10). Since this redirection traveling end point Pp3 is the start point of the loop work traveling, the master tractor 1P lowers the cultivation apparatus 5 (in the working state) here and travels forward, starting the straight loop work traveling.

Figure 12:
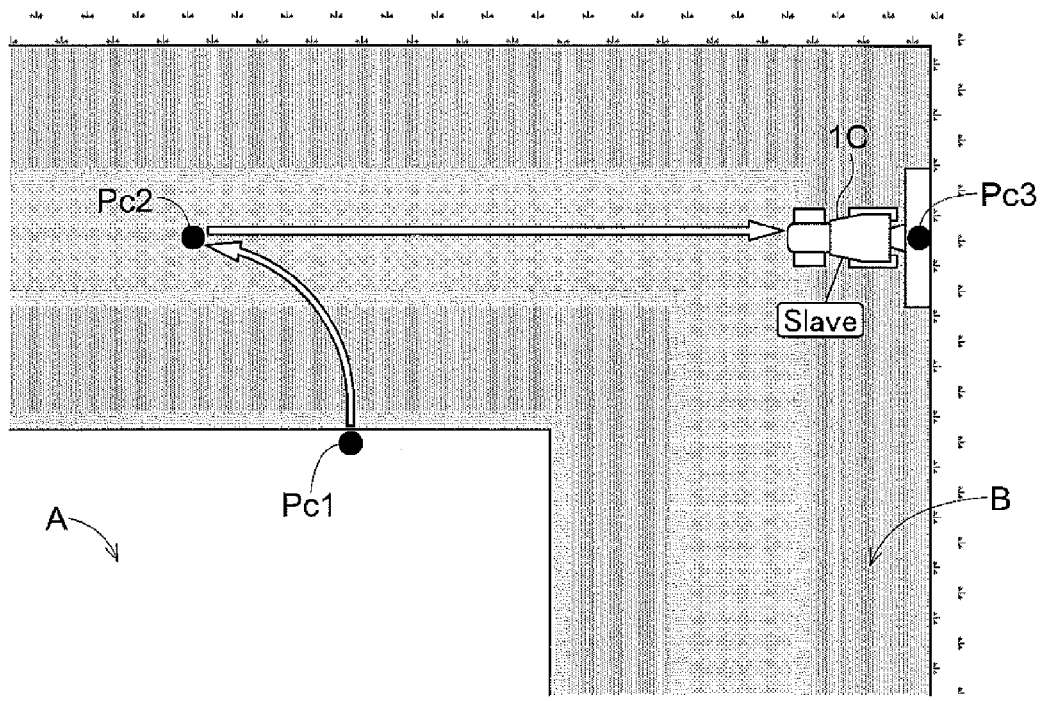
FIG. 12 is a schematic diagram illustrating the redirection traveling of the slave work vehicle at the first corner section.

The redirection traveling of the slave tractor 1C needs to be started after the master tractor 1P passes by the front of the slave tractor 1C, in order to prevent interfering with the master tractor 1P, but during this, the redirection traveling start point Pc1, the redirection point Pc2, which serves as a target of the redirection traveling, and the redirection traveling end point Pc3 of the slave tractor 1C are calculated (see FIG. 12). The travel of the slave tractor 1C to the redirection traveling start point Pc1 is the same as the work traveling for following the master tractor 1P in the central area A, and thus when there is no interference with the master tractor 1P, the slave tractor 1C travels forward to the redirection traveling start point Pc1, where the slave tractor 1C raises the cultivation apparatus 5 and stands by.

Figure 11:
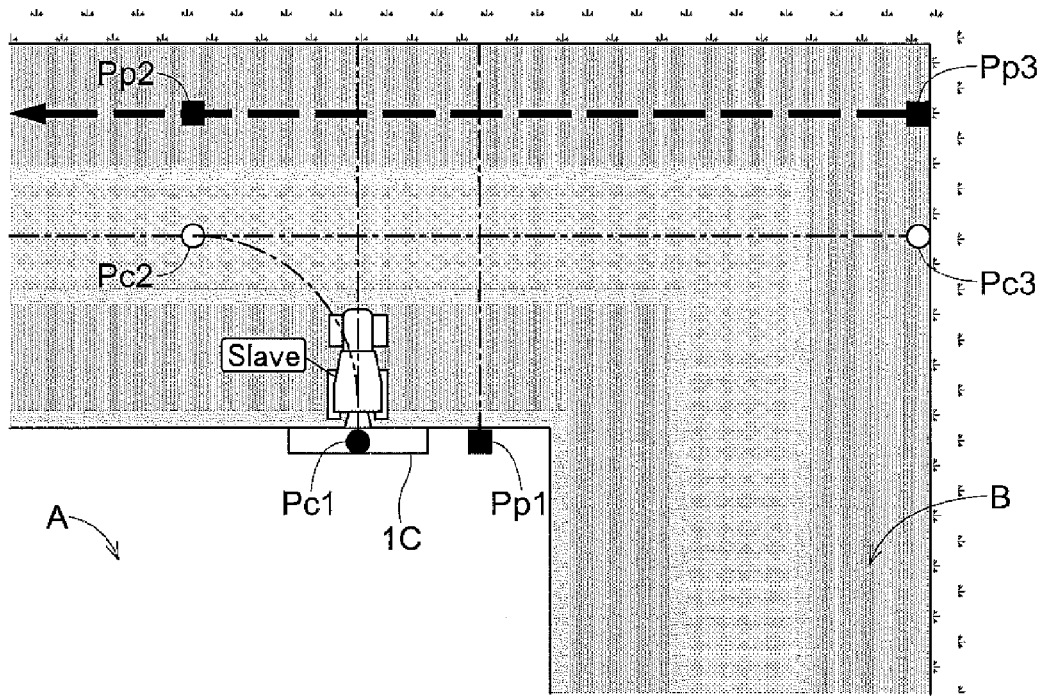
FIG. 11 is a schematic diagram illustrating target traveling points in the redirection traveling of the slave work vehicle at the first corner section.

A method for calculating the redirection point Pc2 and the redirection traveling end point Pc3, which serve as targets for the redirection traveling of the slave tractor 1C, will be described with reference to FIG. 11. A line obtained by translating the traveling track of the master tractor 1P from the position at which the master tractor 1P lowered the cultivation apparatus 5, that is, the loop work traveling start point (redirection traveling end point) Pp3 by a distance that is half of the work width of the master tractor 1P and the slave tractor 1C is calculated as a redirection auxiliary line. The cross point between this redirection auxiliary line and the outer edge of the loop work area B is the redirection traveling end point Pc3 of the slave tractor 1C. The position at which the slave tractor 1C arrives at the redirection auxiliary line from the redirection traveling start point Pc1 of the slave tractor 1C at a steering angle for redirection turning is calculated as the redirection point Pc2. As shown in FIG. 12, when control of the redirection traveling of the slave tractor 1C is started, the slave tractor 1C travels forward while turning from the redirection traveling start point Pc1 to the redirection point Pc2 in the non-working state in which the cultivation apparatus 5 is raised, and then travels backward from the redirection point Pc2 to the redirection traveling end point Pc3. This backward traveling is performed straight toward the redirection traveling end point Pc3 serving as the target traveling position. Since the redirection traveling end point Pc3 serves as the start point of the loop work traveling, the slave tractor 1C lowers the cultivation apparatus 5 at this position, and performs loop work traveling while following the master tractor 1P in the working state, based on the target traveling position that was calculated based on the traveling track of the master tractor 1P.

Figure 13:
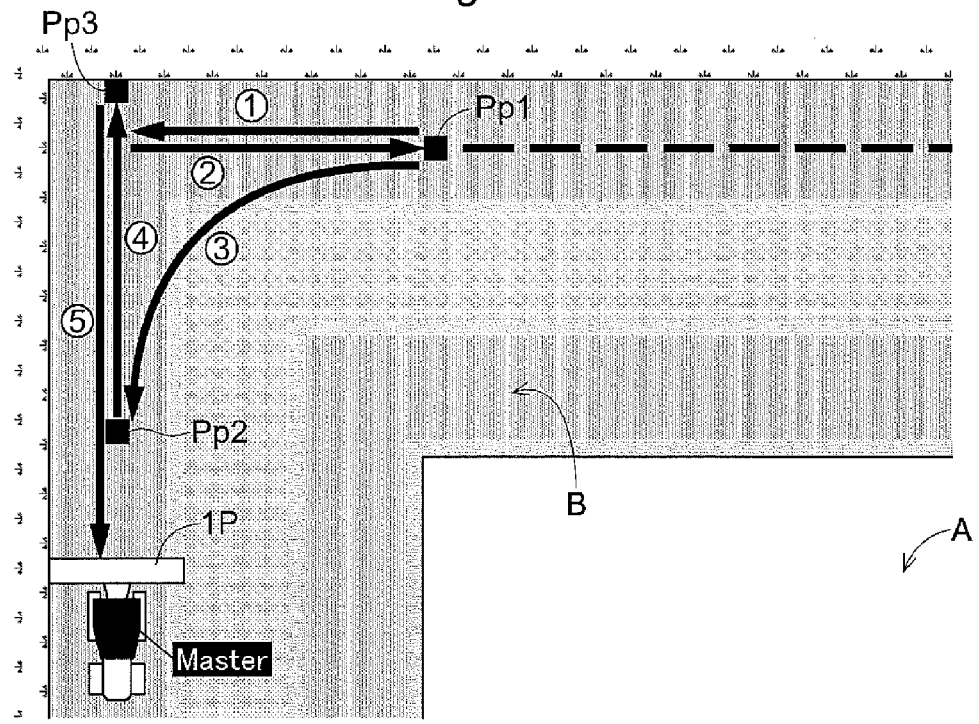
FIG. 13 is a schematic diagram illustrating the redirection traveling of the master work vehicle at the next corner section.

As shown in FIG. 13, when the preceding master tractor 1P has worked and traveled to the outer peripheral end of the next corner section, the master tractor 1P travels backward to the redirection traveling start point Pp1 in the non-working state in which the cultivation apparatus 5 is raised. From here, the second redirection traveling is started. In other words, the master tractor 1P travels forward while turning from this redirection traveling start point Pp1 to the redirection point Pp2 in the non-working state. Then, the master tractor 1P travels backward to the outer edge of the loop work area B, and is stopped. Since this stop point serves as the start point of the next loop work traveling, the master tractor 1P starts forward traveling in the working state in which the cultivation apparatus 5 is lowered. At that time, a line that is obtained by translating the traveling track of the forward traveling (loop work traveling) of this master tractor 1P by a distance that is half of the work width of the master tractor 1P and the slave tractor 1C is calculated, as the redirection auxiliary line here, and the redirection point Pc2 on this redirection auxiliary line is calculated. Then, the redirection traveling start point Pc1 from which the slave tractor 1C can arrive at the redirection point Pc2 at a steering angle for redirection turning is calculated.

Figure 14:
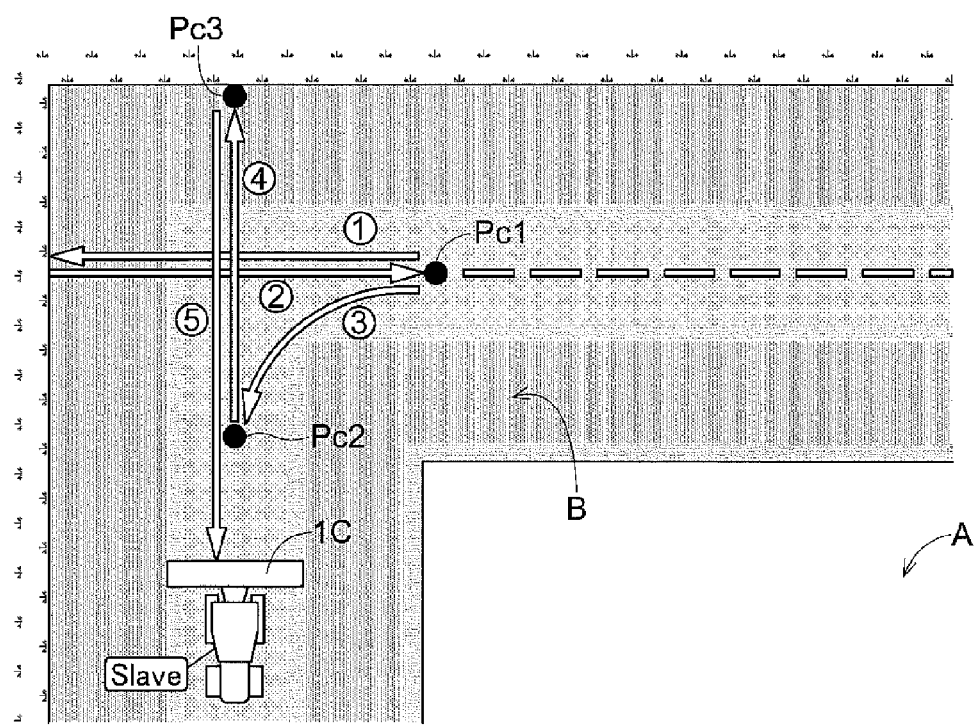
FIG. 14 is a schematic diagram illustrating the redirection traveling of the slave work vehicle at the next corner section.

After approaching the next corner section, the slave tractor 1C stands by until the master tractor 1P arrives at a predetermined point, in order to be prevented from interfering with the master tractor 1P during the redirection traveling. Then, as shown in FIG. 14, the slave tractor 1C remains in the working state and travels as close to the outer edge of the loop work area B as possible beyond the redirection traveling start point. Then, the slave tractor 1C travels backward to the redirection traveling start point Pc1 in the non-working state in which the cultivation apparatus 5 is raised. The redirection traveling from the redirection traveling start point Pc1 is such that the slave tractor 1C travels forward while turning to the redirection point Pp2, similarly to the last redirection traveling. Then, the slave tractor 1C travels backward to the outer edge of the loop work area B, and is stopped.

Since this stop point serves as the start point of the loop work traveling, the slave tractor 1C travels forward in the working state in which the cultivation apparatus 5 is lowered.

When one round traveling has been made through all the corner sections of the loop work area B in the above-described manner, the slave tractor 1C will first exit from the agricultural field because the non-working ground of the loop work area B can be covered only by the master tractor 1P in this example.

[Other Embodiments]

(1) Although only one slave tractor 1C is used in the above-described embodiment, the present invention is applicable to a plurality of slave tractors 1C using a similar control method. In this case, if there are two slave tractors 1C, two following control methods are possible. In one of the methods, a first slave tractor 1C is controlled to follow the track of the master tractor 1P with consideration given to the work width of the master tractor 1P, and a second slave tractor 1C is controlled to follow the track of the master tractor 1P with consideration given to the work width of the first slave tractor 1C as well. In the other of the methods, the first slave tractor 1C is controlled to follow the track of the master tractor 1P, and the second slave tractor 1C is controlled to follow the first slave tractor 1C serving as the master tractor 1P. That is, in the case where there are a plurality of slave tractors 1C, following control in which the preceding slave tractor 1C serves as the master tractor 1P is also possible.

(2) In the work vehicle cooperation system according to the present invention, the redirection traveling tracks of the master tractor 1P and the slave tractor 1C are not limited to the above-described traveling tracks of the embodiment. It is possible to employ various redirection traveling tracks that include the redirection traveling start point Pc1, the redirection point Pc2, and the redirection traveling end point Pc3 of the slave tractor 1C that can be calculated based on the work width of the master tractor 1P and the work width of the slave tractor 1C, and the redirection traveling track of the redirection traveling of the master tractor 1P, the redirection traveling track including the redirection traveling start point Pp1, the redirection point Pp2, and the redirection traveling end point Pp3. Furthermore, there may be one or more redirection points Pp2 and Pc2 of the master tractor 1P and the slave tractor 1C, respectively.

(3) In the above-described embodiment, the master tractor 1P is of a manned-navigation type, but this master tractor 1P may be operated in an unmanned manner by employing a program control method or a remote-control method. The present invention is applicable to a form in which the master tractor 1P, that is, the master work vehicle is also operated in an unmanned manner.

(4) Although, in the above-described embodiment, the tractor on which the cultivation apparatus 5 is mounted is given as an example of a work vehicle, the characteristics of the present invention can be used advantageously even in the case where instead of the cultivation apparatus 5, another working apparatus such as a sprinkling apparatus or a fertilizing apparatus is mounted. Furthermore, the present invention is also applicable to another work vehicle, such as, civil engineering and construction machinery, for example, a combine, a rice-planting machine, a lawnmower, a weeding machine, or a bulldozer. Furthermore, the master work vehicle and the slave work vehicle do not necessarily need to be of the same type, and a combination of, for example, a combine and a conveying truck, or the like is also possible.

(5) If the ground work implement is a cultivation apparatus or the like, an overlap, that is, an overlap length between the master work width and the slave work width is basically essential, but if the ground work implement is a sprinkling apparatus, a fertilizing apparatus, or the like, an overlap is not provided, but a so-called underlap is set, which is a predetermined distance between the master work width and the slave work width. Accordingly, in the present invention, it is not essential to provide an overlap OL, but rather essential to realize following control such that the distance between the routes of the master work vehicle 1P and the slave work vehicle 1C is maintained so as to be in a predetermined range.

INDUSTRIAL APPLICABILITY

The present invention is applicable to a cooperation control system in which a plurality of work vehicles perform work traveling in cooperation with each other.

DESCRIPTION OF REFERENCE SIGNS

1P: Master work vehicle (master tractor)
1C: Slave work vehicle (slave tractor)
61: Master position detection module
62: Master traveling track calculation unit
63: U-turn control module
63a: U-turn work area recording unit
63b: U-turn traveling detection unit
63c: U-turn traveling target calculation unit
64: Loop traveling control module
64a: Loop traveling detection unit
64b: Redirection traveling target calculation unit
64c: Loop work traveling target calculation unit
7: Slave machine control unit
70: Communication module
71: Slave position detection module
72: Navigation control unit 8: Slave machine control module
Pc0: Stand-by point of slave work vehicle
Pp1: Redirection traveling start point (loop work traveling start point) of master work vehicle
Pc1: Redirection traveling start point (loop work traveling start point) of slave work vehicle
Pp2: Redirection point of master work vehicle
Pc2: Redirection point of slave work vehicle
Pp3: Redirection traveling end point of master work vehicle
Pc3: Redirection traveling end point of slave work vehicle
Tp: Master traveling track
Tc: Slave traveling track
A: U-turn work area (central area)
B: Loop work area (U-turn area; peripheral area)

What is claimed is:

1. A work vehicle cooperation system in which a master work vehicle and an unmanned-navigation type slave work vehicle that follows the master work vehicle perform ground work, comprising:
　a master position detection module that detects a position of the master work vehicle;
　a slave position detection module that detects a position of the slave work vehicle;
　a master traveling track calculation unit that calculates a traveling track of the master work vehicle based on the position of the master work vehicle;
　a loop traveling detection unit that detects loop traveling including loop work traveling and redirection traveling, which is constituted by forward traveling and backward traveling, the loop traveling being performed in a loop work area, which is defined as the perimeter of a U-turn work area, the U-turn work area being an area in which work is performed by repeating straight work traveling and U-turns;
　a redirection traveling target calculation unit that calculates a redirection traveling start point and a redirection traveling end point of the slave work vehicle, based on a ground work width of the master work vehicle, a ground work width of the slave work vehicle, and a redirection traveling track that includes a redirection traveling start point and a redirection traveling end point of redirection traveling of the master work vehicle;
　a loop work traveling target calculation unit that calculates a target traveling position in loop work traveling of the slave work vehicle from the redirection traveling end point to a next redirection traveling start point, based on the ground work width of the master work vehicle, the ground work width of the slave work vehicle, and a loop work traveling track of the master work vehicle; and
　a navigation control unit that navigates the slave work vehicle in an unmanned manner based on the redirection traveling start point, the redirection traveling end point, and the target traveling position.

2. The work vehicle cooperation system according to claim 1,
　wherein the redirection traveling is traveling in a non-working state, and a shift point from a working state to the non-working state in the redirection traveling is regarded as the redirection traveling start point of the master work vehicle, and a shift point from the non-working state to the working state in the redirection traveling is regarded as the redirection traveling end point of the master work vehicle, and
　the redirection traveling start point and the redirection traveling end point of the slave work vehicle are calculated based on the redirection traveling start point and the redirection traveling end point of the master work vehicle.

3. The work vehicle cooperation system according to claim 1, wherein the loop traveling detection unit recognizes the redirection traveling of the master work vehicle based on the traveling track of the master work vehicle in the non-working state.

4. The work vehicle cooperation system according to claim 1, wherein the backward traveling to the redirection traveling end point in the redirection traveling of the slave work vehicle is performed irrespective of the traveling track of the master work vehicle.

5. The work vehicle cooperation system according to claim 1,
　wherein the slave position detection module and the navigation control unit are mounted on the slave work vehicle,
　the master position detection module, the master traveling track calculation unit, the loop traveling detection unit, the redirection traveling target calculation unit, and the loop work traveling target calculation unit are mounted on the master work vehicle, and
　the slave work vehicle and the master work vehicle are connected to each other so as to be capable of data transmission.

6. The work vehicle cooperation system according to claim 1,
　wherein the slave position detection module and the navigation control unit are mounted on the slave work vehicle,
　the master position detection module is mounted on the master work vehicle,
　the master traveling track calculation unit, the loop traveling detection unit, the redirection traveling target calculation unit, and the loop work traveling target calculation unit are constructed in a separate control unit, and
　the separate control unit, the slave work vehicle, and the master work vehicle are connected to one another so as to be capable of data transmission.

7. The work vehicle cooperation system according to claim 1, wherein the master work vehicle is of a manned-navigation type.

* * * * *

UNITED STATES PATENT AND TRADEMARK OFFICE
CERTIFICATE OF CORRECTION

PATENT NO. : 9,448,561 B2  Page 1 of 1
APPLICATION NO. : 14/774288
DATED : September 20, 2016
INVENTOR(S) : Yoshitomo Fujimoto et al.

It is certified that error appears in the above-identified patent and that said Letters Patent is hereby corrected as shown below:

On the title page

Column 1, Item (73) Assignee, delete "Coporation," and insert -- Corporation, --

Column 2, Item (57) ABSTRACT, Line 2, delete "tack" and insert -- track --

Column 2, Item (57) ABSTRACT, Line 13, delete "for" and insert -- from --

Signed and Sealed this
Twenty-ninth Day of November, 2016

Michelle K. Lee
*Director of the United States Patent and Trademark Office*